United States Patent
Abe

(10) Patent No.: US 7,900,205 B2
(45) Date of Patent: Mar. 1, 2011

(54) SYSTEM AND METHOD FOR EXECUTING SELECTED TASK BASED ON TASK MANAGEMENT TABLE HAVING AT LEAST ONE TASK AND AT LEAST TWO ASSOCIATED PROCESSORS

(75) Inventor: Mutsumi Abe, Tokyo-to (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1171 days.

(21) Appl. No.: 10/583,371

(22) PCT Filed: Nov. 12, 2004

(86) PCT No.: PCT/JP2004/017225

§ 371 (c)(1),
(2), (4) Date: Jun. 19, 2006

(87) PCT Pub. No.: WO2005/101204

PCT Pub. Date: Oct. 27, 2005

(65) Prior Publication Data

US 2007/0186213 A1    Aug. 9, 2007

(30) Foreign Application Priority Data

Mar. 31, 2004  (JP) .............................. 2004-105365

(51) Int. Cl.
  *G06F 9/46* (2006.01)
  *G06F 11/00* (2006.01)
(52) U.S. Cl. ............................. 718/102; 714/1; 714/2; 714/11; 714/13
(58) Field of Classification Search ......... 718/100–102; 714/13
See application file for complete search history.

(56) References Cited

U.S. PATENT DOCUMENTS 4,318,173 A  *  3/1982  Freedman et al. ........... 718/103

(Continued)

FOREIGN PATENT DOCUMENTS

JP     06-095896      4/1994

(Continued)

OTHER PUBLICATIONS

Russinovich, M: "Inside the Windows NT Scheduler, Part 2", Website of Windows-IT-Pro Magazine, Online! Aug. 1997, pp. 1-6, XP002318776, Retrieved from the Internet: URL:http://www.windowsitpro.com/Articles/Print.cfm?ArticleID=303>' retrieved on Feb. 22, 2005!

*Primary Examiner* — Lewis A Bullock, Jr.
*Assistant Examiner* — Jennifer N To
(74) *Attorney, Agent, or Firm* — Kenyon & Kenyon LLP

(57) ABSTRACT

A task execution system including at least two processors has a task management table registered with an associated relationship between at least a task, a main execution processor for executing the task and an in-charge-of-stoppage processor for executing the task when the main execution processor stops, means for selecting an executable task from among tasks registered in the task management table, means for checking, if a processor other than the processor trying to execute the selected task is registered as the main execution processor for the selected task, a stoppage state of the processor registered as the main execution processor, and means for executing the selected task if the processor registered as the main execution processor remains stopped.

6 Claims, 3 Drawing Sheets

U.S. PATENT DOCUMENTS

| | | | |
|---|---|---|---|
| 4,807,228 A * | 2/1989 | Dahbura et al. | 714/13 |
| 5,437,032 A * | 7/1995 | Wolf et al. | 718/103 |
| 5,608,894 A | 3/1997 | Kawakami et al. | |
| 5,727,210 A | 3/1998 | Dwork et al. | |
| 5,794,036 A | 8/1998 | Gomi et al. | |
| 5,919,266 A * | 7/1999 | Sud et al. | 714/13 |
| 6,052,707 A | 4/2000 | D'Souza | |
| 6,385,638 B1 | 5/2002 | Baker-Harvey | |
| 6,658,595 B1 * | 12/2003 | Thamattoor | 714/11 |
| 2004/0064829 A1 * | 4/2004 | Pallister et al. | 719/327 |
| 2004/0181707 A1 * | 9/2004 | Fujibayashi | 714/6 |
| 2005/0149927 A1 | 7/2005 | Abe | |

FOREIGN PATENT DOCUMENTS

| | | |
|---|---|---|
| JP | 7-038510 A | 2/1995 |
| JP | 7-262025 A | 10/1995 |
| JP | 08-202409 | 8/1996 |
| JP | 10-171668 | 6/1998 |
| JP | 10-240548 A | 9/1998 |
| JP | 11-203149 | 7/1999 |
| JP | 2001-515242 | 9/2001 |

* cited by examiner

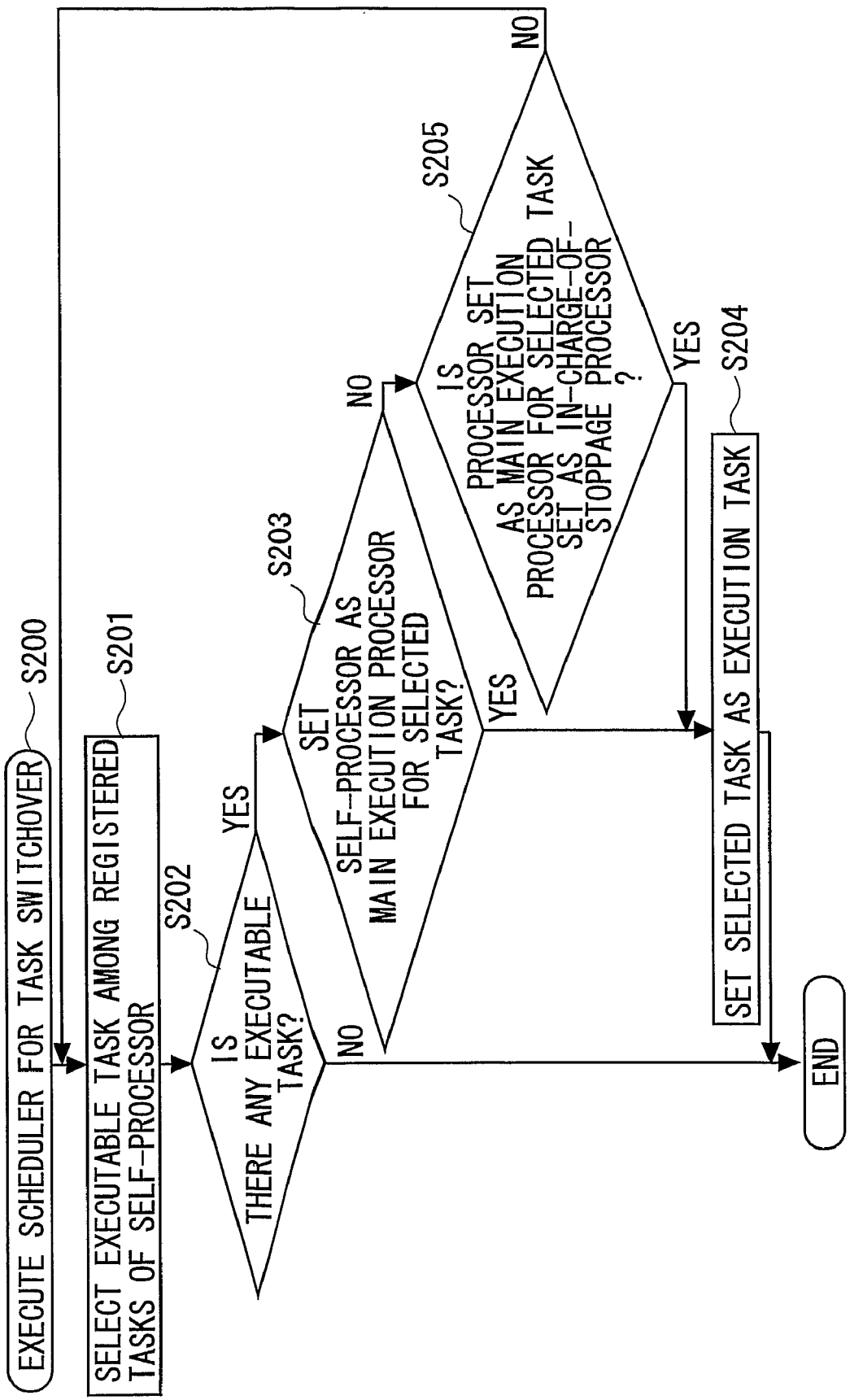

SYSTEM AND METHOD FOR EXECUTING SELECTED TASK BASED ON TASK MANAGEMENT TABLE HAVING AT LEAST ONE TASK AND AT LEAST TWO ASSOCIATED PROCESSORS

This is a 371 national phase application of PCT/JP2004/017225 filed 12 Nov. 2004, claiming priority to Japanese Patent Application No. JP 2004-105365 filed 31 Mar. 2004, the contents of which are incorporated herein by reference.

TECHNICAL FIELD

The present invention relates to a task execution system including at least two pieces of processors.

BACKGROUND ARTS

There has been known a system having a function of changing a task to be processed (refer to, e.g., Patent document 1). In a multiprocessor system, however, if a certain processor falls into stoppage due to a fault, etc., it is impossible to assure an operation of the task processed so far by this processor, resulting in a problem that the operation of the whole system cannot be assured.

Note that in a system for actualizing a function in such a way that a plurality of tasks cooperate with each other through task-to-task communications, a task processing system (see, e.g., Patent document 2) capable of easily dealing with a change, etc. of a-massage between the tasks, which is caused by addition/deletion, etc. of the task, is given as what is related to the present invention.

(Patent document 1) Japanese Patent Laid-Open Publication No.11-203149

(Patent document 2) Japanese Patent Laid-Open Publication No.6-95896

DISCLOSURE OF THE INVENTION

It is an object of the present invention to assure, even if a certain processor stops due to a fault, etc. in a multiprocessor system, an operation of a task processed so far by this processor and also assure an operation of the whole system.

The present invention, which was devised to accomplish the above object, is a task execution system including at least two processors, comprising a task management table registered with an associated relationship between at least a task, a main execution processor for executing the task and an in-charge-of-stoppage processor for executing the task when the main execution processor stops, means for selecting an executable task from among tasks registered in the task management table, means for checking, if a processor other than the processor trying to execute the selected task is registered as the main execution processor for the selected task, a stoppage state of the processor registered as the main execution processor, and means for executing the selected task if the processor registered as the main execution processor remains stopped.

According to the present invention, the task that is to be invariably executed by a certain processor (the main execution processor) is assigned beforehand to other processor (the in-charge-of-stoppage processor), and there is made a task accepting judgment of the task (including the task assigned). Then, the task is executed by the pre-assigned processor when the above processor falls into the stoppage, thereby making it possible to actualize assurance of the operation of the task assigned and to assure the operation necessary for the system.

As a result, there can be improved possibility of assuring the operation of the system even when the system is partially stopped.

Further, the present invention can be specified as follows.

A task execution system including at least two processors, comprises means for judging whether or not a task requested to be registered can be registered as a task of a main execution processor, means for judging whether or not the task requested to be registered can be registered as a task of an in-charge-of-stoppage processor, means for registering, if judged to be registerable as the task of the main execution processor and if judged to be registerable as a task of the in-charge-of-stoppage processor, an associated relationship between the task requested to be registered, the main execution processor and the in-charge-of-stoppage processor, means for selecting an executable task from among the registered tasks, means for checking, if a processor other than the processor trying to execute the selected task is registered as the main execution processor for the selected task, a stoppage state of the processor registered as the main execution processor, and means for executing the selected task if the processor registered as the main execution processor remains stopped.

Moreover, the present invention can be specified by way of the invention of a method as below.

A task execution method in a task execution system including at least two processors, comprises selecting an executable task from among tasks registered in a task management table registered with an associated relationship between at least a task, a main execution processor for executing the task and an in-charge-of-stoppage processor for executing the task when the main execution processor stops, checking, if a processor other than the processor trying to execute the selected task is registered as the main execution processor for the selected task, a stoppage state of the processor registered as the main execution processor, and executing the selected task if the processor registered as the main execution processor remains stopped.

Still further, the present invention can be specified by way of the invention of a program as follows.

A program makes an information processing device including at least two processors, function as a task management table registered with an associated relationship between at least a task, a main execution processor for executing the task and an in-charge-of-stoppage processor for executing the task when the main execution processor stops, means for selecting an executable task from among tasks registered in the task management table, means for checking, if a processor other than the processor trying to execute the selected task is registered as the main execution processor for the selected task, a stoppage state of the processor registered as the main execution processor, and means for executing the selected task if the processor registered as the main execution processor remains stopped.

Yet further, the present invention can be also specified as a storage medium stored with the above program, which can be read by an information processing device (computer).

BRIEF DESCRIPTION OF THE DRAWINGS

FIG. 3 is a flowchart for explaining the operation of the task execution system in the embodiment of the present invention.

BEST MODE FOR CARRYING OUT THE INVENTION

A task management system will hereinafter be described with reference to the drawings by way of one embodiment of the present invention.

(Outline of Architecture of Present System)

Figure 1:
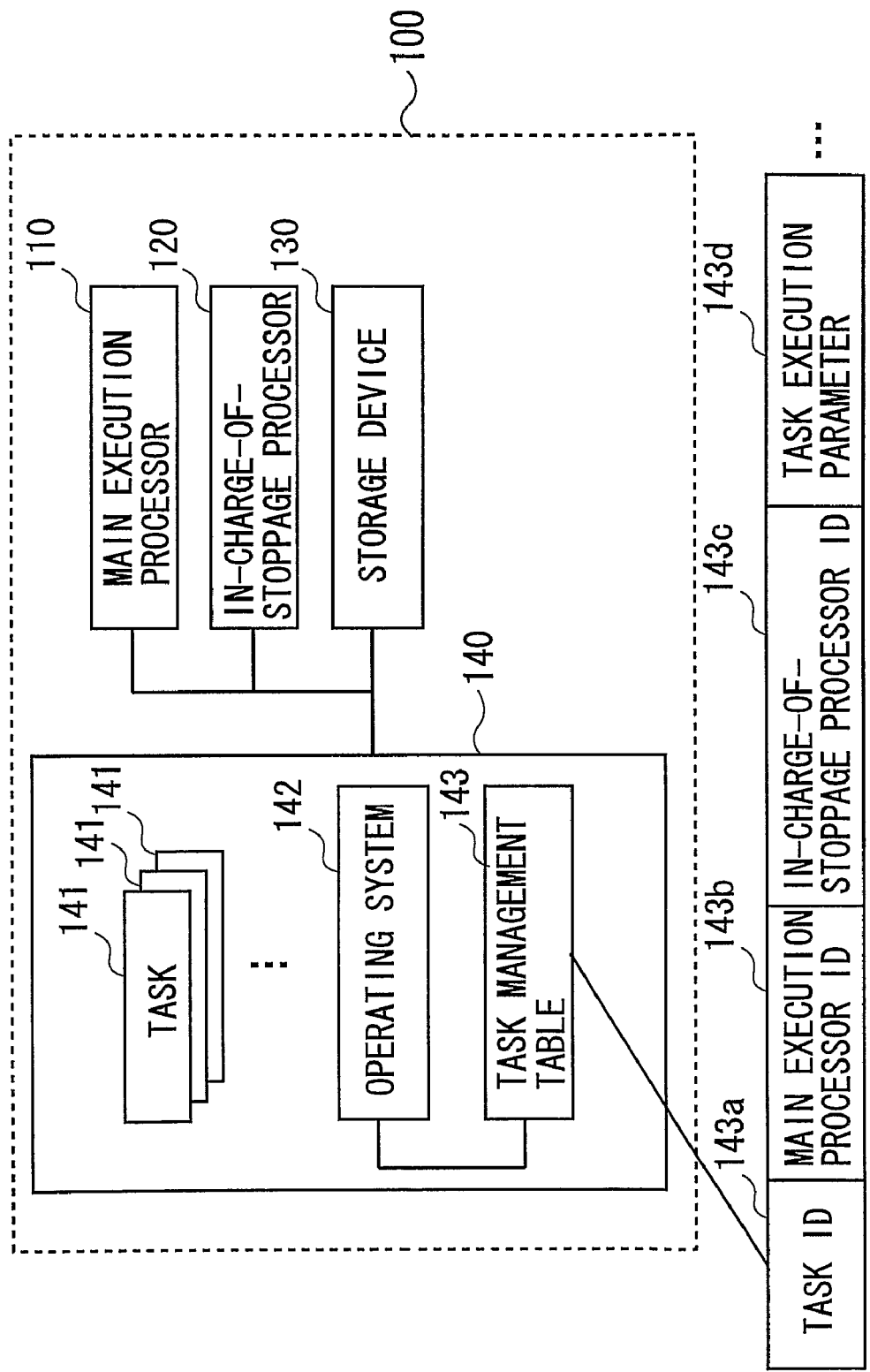
FIG. 1 shows an outline of an architecture of a task execution system by way of an embodiment of the present invention.

FIG. 1 is a diagram for explaining an outline of an architecture of a task execution system.

(System Environment)

The task execution system in the present embodiment is actualized by a general type of information processing device 100 such as a PDA (Personal Digital Assistant), a personal computer and so on.

As shown in FIG. 1, information processing device 100 includes two processors 110, 120 (of which one processor will hereinafter be referred to as a main execution processor 110, and the other processor will be termed an in-charge-of-stoppage processor 120 ), a storage device 130 (such as a hard disk device, etc.) memory 140, and so forth. Further, information processing device 100 includes, in some cases, an input device (for example, a key set) for inputting various information and commands, an image display device (e.g., a liquid crystal display) for displaying a result of processing thereof, a voice output device (for instance, a loudspeaker), etc. Note that although two processors are shown in this exemplary embodiment, the present invention is not limited to two processors. For example, the present invention can be similarly applied even when three or more processors are provided.

(Task and Operating System)

A task 141, which is generally called a process or a thread, is a generic name of an execution unit of a program. The task 141 may be generated when in a task registration and may also be previously generated (pooled) as done in the preceding application by the present applicant. The task 141 is, for example, a QoS (Quality of Service) task defined as a variable task capable of controlling a required quantity of resources.

The operating system (OS) 142 is, for instance, a real time OS having a function (as a scheduler) of scheduling the respective tasks 141 by a DM (Deadline Monotonic) method. Among the executable tasks 141 (corresponding to execution target tasks according to the present invention) at each scheduling timing, the task 141 exhibiting the shortest period of deadline time is set as an active task. Each of the tasks 141 is managed based on a task management table 143.

The task management table 143 is illustrated in the lowest part in FIG. 1. The task management table 143 is a table for managing pieces of information about the respective tasks, and is registered with pieces of the information about the tasks 141, such as a task ID 143a, a main execution processor ID 143b, an in-charge-of-stoppage processor ID 143c, a task execution parameter 143d, and so on.

The task ID 143a serves to identify each task 141.

The main execution processor ID 143b and the in-charge-of-stoppage processor ID 143c serve to identify the respective processors Start timing, execution alignment time, deadline time, etc. are given as the task execution parameter 143d. The start timing is a period of time (period) till next execution start timing since execution start timing of each task 141. When a certain task 141 is executed, it does not happen that this task 141 is executed afresh during this period. The execution assignment time is defined as a resource quantity (which is, for instance, a period of usage time of each processor) assigned to each of the tasks 141. It is to be noted that the resource is not necessarily assigned continuously for a period of assignment time throughout to the task 141 that has been once assigned the resource. A time assignment may be effected separately any number of times. Further, if pre-empted by a different task 141 having a higher priority than a certain task 141, processing of this task 141 is interrupted.

If the alignment time elapses within a certain period of time, nothing affects the system. This period of time is the deadline time. In the present embodiment, the task 141 exhibiting a short period of deadline time is given a higher priority than that of the task 141 showing a long period of deadline time. The task 141 having the short deadline time (i.e., the task 141 given the high priority) is set as an active task.

Predetermined programs such as API (Application Program Interface), etc. for providing the schedule function described above and other various functions that will be described later on, are read by the aforementioned information processing device 100 and installed into the operating system 142, thereby actualizing these functions. Note that the operating system 142 and the predetermined programs, etc. are pre-installed into the storage device 120 or the like, and are properly read into the memory 140 and executed as the necessity arises (see FIG. 1).

(Operation at Task Registration)

Figure 2:
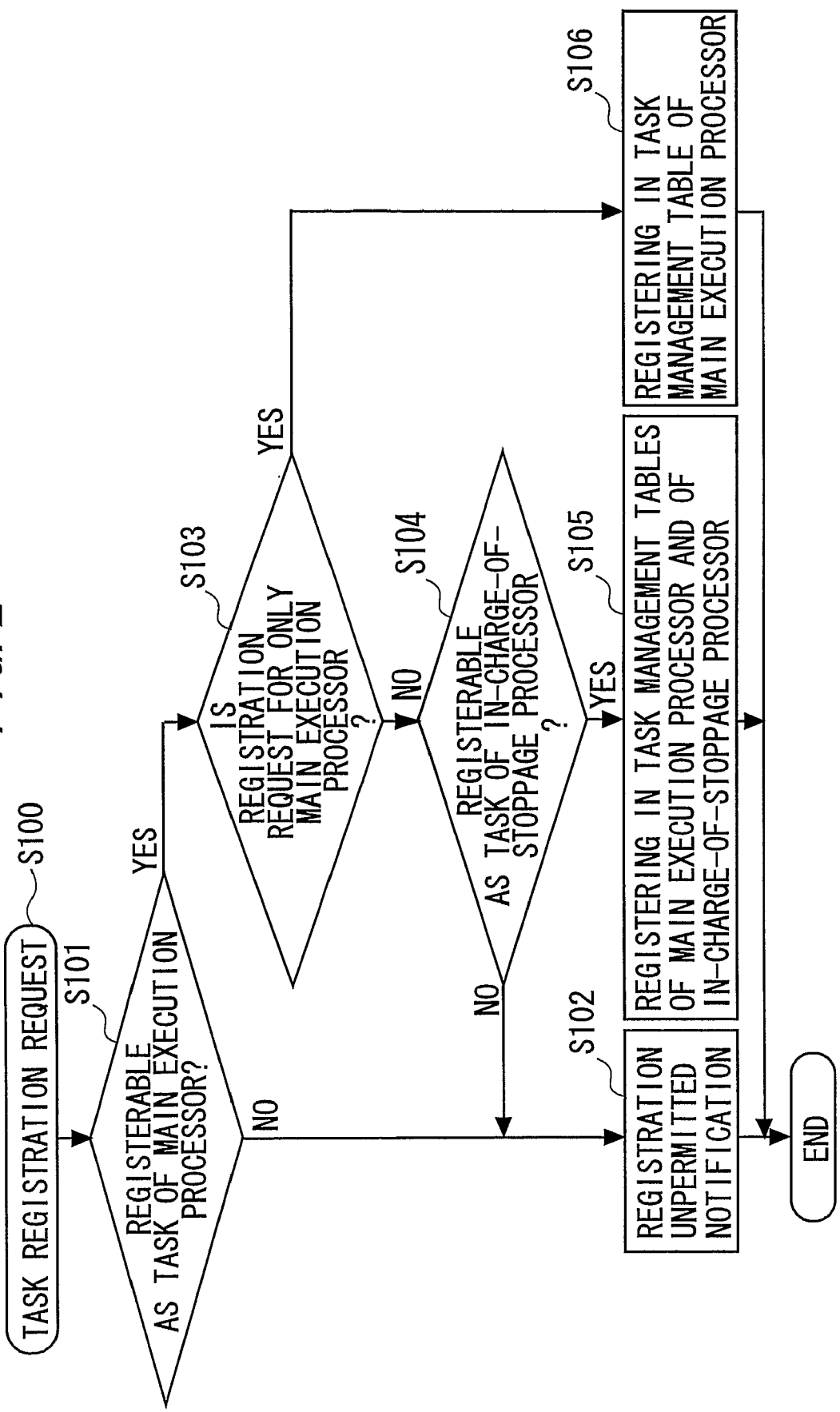
FIG. 2 is a flowchart for explaining an operation of the task execution system in the embodiment of the present invention.

Next, an operation of the task management system having the architecture described above will be explained with reference to the drawings. To start with, processes when registering the task will be described. FIG. 2 is an explanatory flowchart of the processes when registering the task.

The operating system 142, etc., is read and executed by the information processing device 100, thereby actualizing the following processes. When a task registration request is given from the operating system 142, a predetermined application, etc. (S100), it is judged whether or not the task 141 requested to be registered (which will hereinafter be also called a registration target task) can be registered as a task of the main execution processor 110 (which is identified, if the registration request in S100 contains the main execution processor ID, by this main execution processor ID) (S101) This is, in the case of registering, for example, the registration target task 141 as a task of the main execution processor 110, the judgment as to whether or not the execution can be done while keeping QoS in a way that includes this s registration target task 141, wherein it is judged whether predetermined conditions are met or not.

As a result, if the registration target task 141 i s judged not to be the task of the main execution processor 110 (S101: No), this registration target task 141 is not registered, and registration unpermitted notification is given (S102).

While on the other hand, if judged to be registerable as the task of the main execution processor 110 (S101: Yes), it is further judged whether or not the task registration request (S100) is for only the main execution processor (S103). This can be, it is considered, judged by knowing whether or not, for example, the task registration request (S100) contains only the main execution processor ID (i.e., whether this request contains also the in-charge-of-stoppage processor ID or not).

As a result, if not judged to contain only the main execution processor ID (for example, if judged to contain also the in-charge-of-stoppage processor ID) (S103: No), it is further judged whether or not this registration target task 141 can be registered as a task of the in-charge-of-stoppage processor (S104). This is, for instance, if this registration target task 141 is registered as the task of the in-charge-of-stoppage processor 120 (which is identified, for example, when the registration request in S100 contains the in-charge-of-stoppage processor ID, by this in-charge-of-stoppage processor ID), a judgment as to whether or not the execution can be done while keeping QoS in a way that includes this registration target task 141, wherein it is judged whether the predetermined conditions are met or not.

As a result, if not judged to be registerable as the task of the in-charge-of-stoppage processor 120 (S104: No) this registration target task 141 is not registered, and the registration unpermitted notification is given (S102).

While on the other hand, if judged to be registerable as the task of the in-charge-of-stoppage processor 120 (S104: Yes), the registration target task 141 is registered in the task management tables of the main execution processor 110 and of the in-charge-of-stoppage processor 120 (S105). Namely, each task management table 143 is registered with the task ID 143a of the registration target task 141, the main processor ID 143b, the in-charge-of-stoppage processor ID 143c and the task execution parameter 143d.

While on the other hand, as a result of the judgment in S103, when judging that the registration request is for only the main execution processor (for instance, if judged not to contain the in-charge-of-stoppage processor ID) (S103: Yes) this registration target task 141 is registered in the task management table 143 of the main execution processor (S106) Namely, the task management table 143 of the main execution processor is registered with the task ID 143a of the task 141 requested to be registered, the main processor ID 143b, and the task execution parameter 143d.

As discussed above, when registering the task, there are assigned the processor ID (the main execution processor ID) of the processor that mainly executes the task and the processor ID (the in-charge-of-stoppage processor ID) of the processor that executes the task in case of stoppage of the processor that mainly executes the task. Then, when the task registration request is given (S100), at first, the system making an acceptance judgment executes an acceptance process (S101, S103, S104), and, if executable, the task requested is registered (S105, S106).

(Operation at Task Switchover)

Next, processes when switching over the task will be explained. FIG. 3 is an explanatory flowchart showing the processes when switching over the task.

The operating system 142 (such as the scheduler), etc. is read and executed by the information processing device 100, thereby actualizing-the following processes.

When the scheduler is executed (S200), an executable task is selected from among the registered tasks of the self-processor (S201). For instance, when switchover timing based on the task scheduling is reached, a task exhibiting a shorter period of deadline time is selected from among the tasks 141 registered in the task management table 143 of the self-processor. Note that if none of the executable tasks exist (S202: No), the task switchover process is not executed but is terminated.

Whereas if the executable task exists (S202: Yes), it is judged whether or not the self-processor is set as the main execution processor for the task (which will hereinafter be also called a selected task) selected in S201 (S203). The task management table 143 of the self-processor is referred to for making this judgment. The task management table 143 is registered with an associated relationship between the task ID 143a and the main execution processor ID 143b (see FIG. 1). It is therefore possible by referring to this task management table 143 to judge whether or not the self-processor is set as the main execution processor for the selected task.

As a result, if the self-processor is judged to be set as the main execution processor for the selected task (S203: Yes), the selected task is set as an execution task (S204) Namely, the selected task is executed.

While on the other hand, if the self-processor is not judged to be set as the main execution processor for the selected task (for instance, if a processor other than the self-processor is set as the main execution processor) (S203: No), it is further judged whether or not the processor set as the main execution processor for the selected task is stopped (i.e., a stoppage state of the processor set as the main execution processor is checked) and whether or not the self-processor is set as the in-charge-of-stoppage processor for the selected task (S205). The task management table 143 of the self-processor is referred to for making the latter judgment. The task management table 143 is registered with an associated relationship between the task ID 143a and the in-charge-of-stoppage processor ID 143c (see FIG. 1). It is therefore feasible by referring to this task management table 143 to judge whether or not the self-processor is set as the in-charge-of-stoppage processor for the selected task. Incidentally, it is considered as a method for the latter judgment to check the stoppage state by directly querying, about an operation state, the processor set as the main execution processor for the selected task.

As a result, when judging that the processor set as the main execution processor for the selected task remains stopped (such as a case of falling into becoming inoperable due to a fault, etc.), and when the self-processor is set as the in-charge-of-stoppage processor for the selected task (S205: Yes) the selected task is set as the execution task (S204). Namely, the selected task is executed.

On the other hand, as a result of the judgment in S205, if it is not judged that the processor set as the main execution processor for the selected task remains stopped, or if the self-processor is not set as the in-charge-of-stoppage processor (S205: No), the operation returns to S201, wherein the processes from S201 onward are re-executed.

As discussed above, when each of the processors 110 and 120 executes the task, the task is executed based on the management information of the registered tasks. On this occasion, however, if it proves from reading the processor ID that a processor other than the self-processor is set as the main execution processor (S203: No), a stoppage condition of that processor is checked (S205). If stopped (S205: Yes), the task thereof is executed (S204).

Thus, the stoppage condition of the processor is checked at the operation timing of each task (S205), and hence it follows that surrogation of executing the task is promptly conducted. Further, the task that is to be invariably executed by the main execution processor 110 is assigned beforehand to the in-charge-of-stoppage processor 120, whereby the task can be executed by the pre-assigned processor 120 when the processor 110 falls into the stoppage. Accordingly, it is possible to improve the possibility of assuring the operation of the system even when the system is partially stopped.

The present invention can be embodied in a variety of forms without deviating from the sprit or the principal features thereof. Hence, the embodiment discussed above is nothing but a mere exemplification in every aspect. The present invention should not be limitedly construed by description of the embodiment.

INDUSTRIAL APPLICABILITY

According to the present invention, the task that is to be invariably executed by a certain processor (the main execution processor) is assigned beforehand to other processor (the in-charge-of-stoppage processor). The task is executed by the pre-assigned processor when the above processor falls into the stoppage, thereby enabling the improvement of the possibility of assuring the operation of the system even when the system is partially stopped (when the main execution processor stops).

The invention claimed is:

1. A task execution system including at least two processors, comprising:
   a task management table registered with a plurality of tasks, the task management table specifying, for each task in the plurality of tasks, a main execution processor for executing the task and an in-charge-of-stoppage processor for executing the task when the main execution processor stops, wherein each of the plurality of tasks is assigned its corresponding main execution processor and in-charge-of-stoppage processor prior to receiving an instruction to execute the task, whereby no processor other than that assigned as the main execution or in-charge-of-stoppage processor may actually execute the task;
   a selecting unit selecting an executable task from among tasks registered in the task management table;
   a processor that tries to execute the selected task;
   a checking unit checking a stoppage state of a processor registered as the main execution processor for the selected task registered as said main execution processor when the processor that tries to execute the selected task is not registered as the main execution processor for the selected task; and
   wherein the processor that tries to execute the selected task executes the selected task if the processor registered as the main execution processor is stopped and the processor that tries to execute the selected task is registered as the in-charge-of-stoppage processor for the selected task.

2. A task execution system including at least two processors, comprising:
   a first judging unit judging whether a requested task requested to be registered can be is registered as a task of a main execution processor;
   second judging unit judging whether the requested task requested to be registered can be is registered as a task of an in-charge-of-stoppage processor;
   a registering unit registering, prior to receiving an instruction to execute the requested task, an associated relationship between the requested task, the main execution processor, and the in-charge-of-stoppage processor when the requested task can be registered as a task of the main execution processor and the in-charge-of-stoppage processor;
   a selecting unit selecting an executable task from among the registered tasks;
   a processor that tries to execute the selected task;
   a checking unit checking a stoppage state of a processor registered as the main execution processor for the selected task when the processor that tries to execute the selected task is not registered as the main execution processor for the selected task; and
   wherein the processor that tries to execute the selected task executes the selected task if the processor registered as the main execution processor of the selected task is stopped and the processor that tries to execute the selected task is registered as the in-charge-of-stoppage processor for the selected task.

3. A task execution method in a task execution system including at least two processors, comprising:
   selecting an executable task from among tasks registered in a task management table, the task management table being registered with a plurality of tasks and specifying, for each task in the plurality of tasks a main execution processor for executing the task and an in-charge-of-stoppage processor for executing the task when the main execution processor stops, wherein each of the plurality of tasks is assigned its corresponding main execution processor and in-charge-of-stoppage processor prior to receiving an instruction to execute the task, whereby no processor other than that assigned as the main execution or in-charge-of-stoppage processor may actually execute the task;
   providing a processor that tries to execute the selected task;
   checking a stoppage state of a processor registered as the main execution processor for the selected task when the processor that tries to execute the selected task is not registered as the main execution processor for the selected task; and
   executing the selected task if the processor registered as the main execution processor is stopped, wherein the selected task is executed by the processor that tries to execute the selected task, and wherein the processor that tries to execute the selected task is registered as the in-charge-of-stoppage processor for the selected task.

4. A program recorded on a computer-storage medium executed by a computer thereby performing the steps of:
   selecting an executable task from among tasks registered in a task management table, the task management table being registered with a plurality of tasks and specifying, for each task in the plurality of tasks, a main execution processor for executing the task and an in-charge-of-stoppage processor for executing the task when said the main execution processor stops, wherein each of the plurality of tasks is assigned its corresponding main execution processor and in-charge-of-stoppage processor prior to receiving an instruction to execute the task;
   providing a processor that tries to execute the selected task;
   checking a stoppage state of a processor registered as the main execution processor for the selected task when the processor that tries to execute the selected task is not registered as the main execution processor for the selected task; and
   executing the selected task if the processor registered as the main execution processor is stopped, wherein the selected task is executed by the processor that tries to execute the selected task, and wherein the processor that tries to execute the selected task is registered as the in-charge-of-stoppage processor for the selected task.

5. A personal digital assistant comprising a program that when executed perform the steps of:
   selecting an executable task from among tasks registered in a task management table, the task management table being registered with a plurality of tasks and specifying, for each task in the plurality of tasks, a main execution processor for executing the task and an in-charge-of-stoppage processor for executing the task when said the main execution processor stops, wherein each of the plurality of tasks is assigned its corresponding main execution processor and in-charge-of-stoppage processor prior to receiving an instruction to execute the task;
   providing a processor that tries to execute the selected task;
   checking a stoppage state of a processor registered as the main execution processor for the selected task when the processor that tries to execute the selected task is not registered as the main execution processor for the selected task; and
   executing the selected task if the processor registered as the main execution processor is stopped, wherein the selected task is executed by the processor that tries to execute the selected task, and wherein the processor that tries to execute the selected task is registered as the in-charge-of-stoppage processor for the selected task.

6. A personal computer comprising a program that when executed perform the steps of:
selecting an executable task from among tasks registered in a task management table, the task management table being registered with a plurality of tasks and specifying, for each task in the plurality of tasks, a main execution processor for executing the task and an in-charge-of-stoppage processor for executing the task when said the main execution processor stops, wherein each of the plurality of tasks is assigned its corresponding main execution processor and in-charge-of-stoppage processor prior to receiving an instruction to execute the task;
providing a processor that tries to execute the selected task;
checking a stoppage state of a processor registered as the main execution processor for the selected task when the processor that tries to execute the selected task is not registered as the main execution processor for the selected task; and
executing the selected task if the processor registered as the main execution processor is stopped, wherein the selected task is executed by the processor that tries to execute the selected task, and wherein the processor that tries to execute the selected task is registered as the in-charge-of-stoppage processor for the selected task.

* * * * *

UNITED STATES PATENT AND TRADEMARK OFFICE
CERTIFICATE OF CORRECTION

PATENT NO. : 7,900,205 B2  
APPLICATION NO. : 10/583371  
DATED : March 1, 2011  
INVENTOR(S) : Mutsumi Abe Page 1 of 1

It is certified that error appears in the above-identified patent and that said Letters Patent is hereby corrected as shown below:

| Column | Line | |
|---|---|---|
| 1 | 30 | Change "a-massage" to --a message--. |
| 3 | 23 | Change "disk device, etc.)" to --disk device, etc.),--. |
| 7 | 38 | After "can be" delete "is". |
| 7 | 41 | After "can be" delete "is". |
| 8 | 29 | After "when said" delete "the". |
| 8 | 52 | After "when said" delete "the". |
| 9 | 8 | After "when said" delete "the". |

Signed and Sealed this  
Sixteenth Day of August, 2011

David J. Kappos  
*Director of the United States Patent and Trademark Office*